(12) United States Patent
Sathya

(10) Patent No.: US 8,768,945 B2
(45) Date of Patent: Jul. 1, 2014

(54) SYSTEM AND METHOD OF ENABLING IDENTIFICATION OF A RIGHT EVENT SOUND CORRESPONDING TO AN IMPACT RELATED EVENT

(76) Inventor: Vijay Sathya, Karnataka (IN)

( * ) Notice: Subject to any disclaimer, the term of this patent is extended or adjusted under 35 U.S.C. 154(b) by 7 days.

(21) Appl. No.: 13/321,766

(22) PCT Filed: May 21, 2010

(86) PCT No.: PCT/IN2010/000342
§ 371 (c)(1),
(2), (4) Date: Nov. 21, 2011

(87) PCT Pub. No.: WO2010/134098
PCT Pub. Date: Nov. 25, 2010

(65) Prior Publication Data
US 2012/0066242 A1 Mar. 15, 2012

(30) Foreign Application Priority Data
May 21, 2009 (IN) .............................. 1160/CHE/2009

(51) Int. Cl.
*G06F 17/30* (2006.01)
(52) U.S. Cl.
USPC .............. 707/758; 707/803; 706/48; 725/113
(58) Field of Classification Search
USPC .................... 707/758; 706/48; 725/112–113; 382/106, 298–299
See application file for complete search history.

(56) References Cited

U.S. PATENT DOCUMENTS

| | | | | |
|---|---|---|---|---|
| 5,835,667 A * | 11/1998 | Wactlar et al. | ................. | 386/241 |
| 7,412,708 B1 * | 8/2008 | Khan et al. | .................... | 719/318 |
| 7,616,816 B2 * | 11/2009 | Cheng | ............................ | 382/181 |
| 7,962,330 B2 * | 6/2011 | Goronzy et al. | .............. | 704/201 |
| 8,346,777 B1 * | 1/2013 | Auerbach et al. | ............. | 707/741 |
| 2004/0068627 A1 * | 4/2004 | Sechrest et al. | ............... | 711/158 |
| 2004/0223740 A1 * | 11/2004 | Itoi | ................................. | 386/95 |
| 2005/0039177 A1 * | 2/2005 | Burke | ........................... | 717/165 |
| 2005/0125223 A1 | 6/2005 | Divakaran et al. | | |
| 2005/0144016 A1 * | 6/2005 | Hewitt et al. | ..................... | 704/278 |
| 2005/0235119 A1 * | 10/2005 | Sechrest et al. | ............... | 711/158 |
| 2005/0289151 A1 * | 12/2005 | Burke | ........................... | 707/100 |
| 2007/0006065 A1 * | 1/2007 | Jewsbury et al. | ........... | 715/500.1 |
| 2007/0124678 A1 * | 5/2007 | Agnihotri et al. | .............. | 715/720 |
| 2007/0248327 A1 | 10/2007 | Chen | | |
| 2007/0288978 A1 * | 12/2007 | Pizzurro et al. | ............... | 725/112 |
| 2008/0086363 A1 * | 4/2008 | Kass et al. | ....................... | 705/10 |
| 2008/0138029 A1 * | 6/2008 | Xu et al. | ........................... | 386/46 |

(Continued)

OTHER PUBLICATIONS

The international publication and ISR dated Nov. 10, 2010.

*Primary Examiner* — Hanh Thai
(74) *Attorney, Agent, or Firm* — Garcia-Zamor IP Law; Ruy M. Garcia-Zamor

(57) ABSTRACT

A system and method of enabling identification of a right event sound (ES) corresponding to an impact related event is described. The instant invention facilitates the identification of the most appropriate sound for an impact related audio-video event thereby enabling the content producers to mix it with the video content and provide the viewers a near life like experience. The instant invention further provides a method to create an Audio-Video Database Library (AVD) to initialize the system. A method of determining the intensity of impact for an event in terms of pixels traversed by the impact object as evaluated across the video frames before, at and after the frame of impact is also discussed herein.

24 Claims, 15 Drawing Sheets

(56) References Cited

U.S. PATENT DOCUMENTS

| | | | |
|---|---|---|---|
| 2008/0227067 A1* | 9/2008 | Seymour | 434/238 |
| 2009/0022420 A1* | 1/2009 | Kondo et al. | 382/276 |
| 2009/0070438 A1* | 3/2009 | Bartholomew | 709/219 |
| 2009/0228422 A1* | 9/2009 | Yen et al. | 706/52 |
| 2009/0238378 A1* | 9/2009 | Kikinis et al. | 381/92 |
| 2009/0300500 A1* | 12/2009 | Arrasvuori | 715/723 |
| 2010/0058220 A1* | 3/2010 | Carpenter | 715/772 |
| 2010/0154007 A1* | 6/2010 | Touboul et al. | 725/60 |

\* cited by examiner

| Impact Actor | Distance Scale | Impact Trajectory | EID |
|---|---|---|---|
| Foot | Very Short | Ground - Ground | EID1 |
| Foot | Short | Ground - Air | EID2 |
| Foot | Short | Ground - Air | EID3 |
| Foot | Short | Air - Air | EID3 |
| Foot | Short -Medium | Ground - Ground | EID4 |
| Foot | Short -Medium | Ground - Air | EID5 |
| Foot | Short -Medium | Air - Air | EID6 |
| Foot | Medium-Long | Ground - Ground | EID7 |
| Foot | Medium-Long | Ground - Air | EID8 |
| Foot | Medium-Long | Air - Air | EID9 |
| Foot | OnGoal | Ground - Air | EID10 |
| Foot | OnGoal | Air - Air | EID11 |
| Foot | Long | Ground - Air | EID12 |
| Foot | Long | Air - Air | EID13 |
| Hand | Very Short | Ground - Ground | EID14 |
| Hand | Very Short | Air - Air | EID15 |
| Hand | Very Short | Not Applicable | EID16 |
| Hand | Very Short | Air - Air | EID17 |
| Hand | Very Short | Air - Ground | EID18 |
| Body | Very Short | Air - Air | EID19 |
| Body | Very Short | Air - Air | EID20 |
| Body | Very Short | Air - Air | EID21 |
| Body | Very Short | XXX | EID22 |
| Others | Very Short | XXX | EID23 |
| Others | Very Short | XXX | EID24 |
| Others | Very Short | XXX | EID25 |
| Others | Very Short | XXX | EID26 |

FIGURE 15

SYSTEM AND METHOD OF ENABLING IDENTIFICATION OF A RIGHT EVENT SOUND CORRESPONDING TO AN IMPACT RELATED EVENT

CROSS REFERENCE TO RELATED APPLICATIONS

This application claims priority to each of the following applications: (1) Indian Provisional Patent Application No. 1160/CHE/2009 filed on May 21, 2009; and (2) Patent Cooperation Treaty Application PCT/IN2010/000342, filed May 21, 2010. Each of the above cited applications is hereby incorporated by reference herein as if fully set forth in its entirety.

FIELD OF INVENTION

The present invention relates to system and method of enabling identification of a right sound corresponding to an event. hereinafter, Event Sound or ES.

More particularly the present invention relates to a system and method of enabling identification of an ES corresponding to an event wherein the event is an impact related event.

More particularly the present invention relates to a system and method of enabling identification of an ES wherein the event data is received by the system as digital video (or audio & video data)

More particularly the present invention relates to a system and method of enabling identification of an ES wherein the system utilizes intelligent methods to identify the exact digital video frame where the event has occurred.

More particularly the present invention relates to a system and method of enabling identification of an ES wherein said ES is the most appropriate sound as should be perceived by the ear in conjunction with the visual presentation of the event.

The instant invention also relates to a system and method where one can create a impact intensity based audio-video media library (hereinafter also referred to as AVD).

The instant invention also relates to a method of determining the intensity of impact for an event in terms of pixels traversed by the impact object as evaluated across the video frames before, at and after the frame of impact.

BACKGROUND OF THE INVENTION

The Advent of HD (High definition) has brought the spotlight on enhanced resolution and quality of the Video and Audio components of a broadcast signal or Audio Video Stream.

In regard to Video quality, HD Production is aimed at increasing the resolution of the video captured. HD video production is currently achieved using HD cameras.

When it comes to Audio quality, there are two key dimensions: 1) Surround sound and 2) HD Audio. Surround sound provides a realistic audio ambience. HD Audio, is the intricate tapestry of sounds that accompanies the intensity and emotion of key events perceived in the Visual.

Whereas Surround sound capture and production is feasible using surround sound and/or Ambience microphone, capturing specific event related sounds for HD Audio and presenting them suitably in conjunction with the event visual is much more complex. Because capturing event related sounds is not always possible, such sounds are often recorded and/or retrieved from sound libraries and used for mixing with the visual of the event.

A key challenge in HD Audio production, is the task of identifying the exact sound for an event. The problem further aggravates incase of impact related events like say for example when a player hits a ball during a soccer game. This is because the player can hit the ball with different impacts and different impact shall create a different sound. Not surprisingly therefore DVD releases of soccer games hardly ever feature the sound of the ball being kicked.

Therefore a need exists for a system and method that enables the identification of right event sound corresponding to an impact related event. If this is achieved it shall help the content producers create audio-video content which shall be life like.

SUMMARY AND OBJECT OF THE INVENTION

A system and method of enabling identification of a right event sound (ES) corresponding to an impact related event is described. The instant invention facilitates the identification of the most appropriate sound for an impact related audio-video event thereby enabling the content producers to mix it with the video content and provide the viewers a near life like experience. The instant invention further provides a method to create an Audio-Video Database Library (AVD) to initialize the system. A method of determining the intensity of impact for an event in terms of pixels traversed by the impact object as evaluated across the video frames before, at and after the frame of impact is also discussed herein.

The object of the instant invention is to provide a system and method of enabling identification and mixing of a sound corresponding to an event.

Yet another object of the instant invention is to provide a system and method of enabling identification and mixing of a sound corresponding to an event wherein the event is an impact related event.

Yet another object of the instant invention is to provide a system and method of enabling identification and mixing of a sound corresponding to an event wherein the event data is received by the system as digital video (or audio/video data)

Yet another object of the instant invention is to provide a system and method of enabling identification and mixing of a sound corresponding to an event wherein the system utilizes intelligent methods to identify the exact digital video frame where the event has occurred.

Yet another object of the instant invention is to provide a system and method of enabling identification and mixing of a sound corresponding to an event wherein the system enables identification of the most appropriate sound as should be conceived by the ear with respect to an impact related event.

Yet another object of the instant invention is to provide a system and method where one can create a impact intensity based audio-video media library (hereinafter also referred to as AVD).

Yet another object of the instant invention is to provide a method of determining the intensity of impact for an event in terms of pixels traversed by the impact object as evaluated across the video frames before and after the frame of impact.

BRIEF DESCRIPTION OF ACCOMPANYING DRAWINGS

The features of this invention together with its objects and advantages thereof may be best understood by reference to the description taken in conjunction with the accompanying drawings.

FIG. 15 illustrates the classification table depicting various values of impact actors, distance scale trajectory event name (EID) used to show an application of the instant invention.

DESCRIPTION OF THE PREFERRED EMBODIMENT

Reference will now be made with reference to the accompanying drawings.

Figure 1:
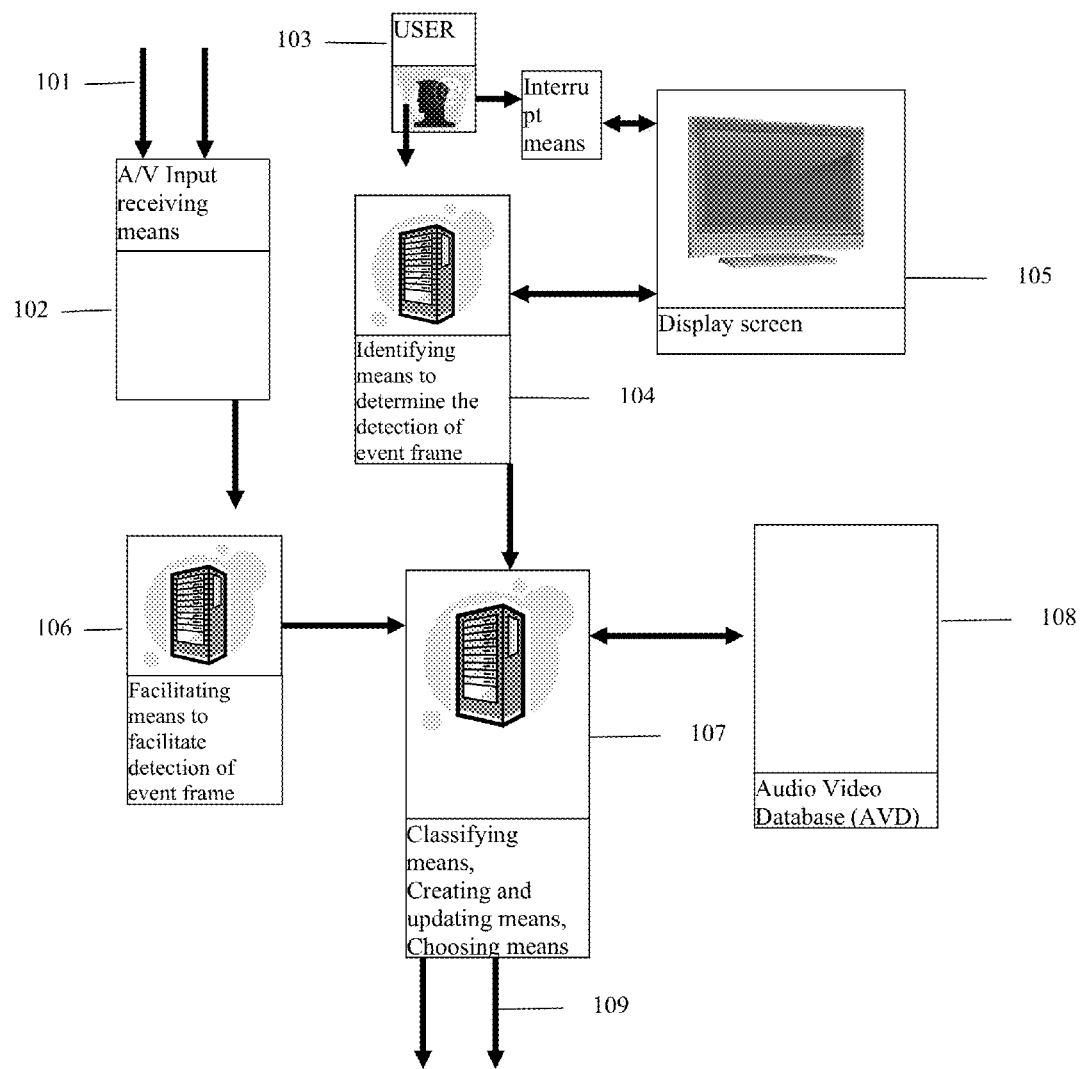
FIG. 1 illustrates the system in one of its preferred embodiments.
Figure 2:
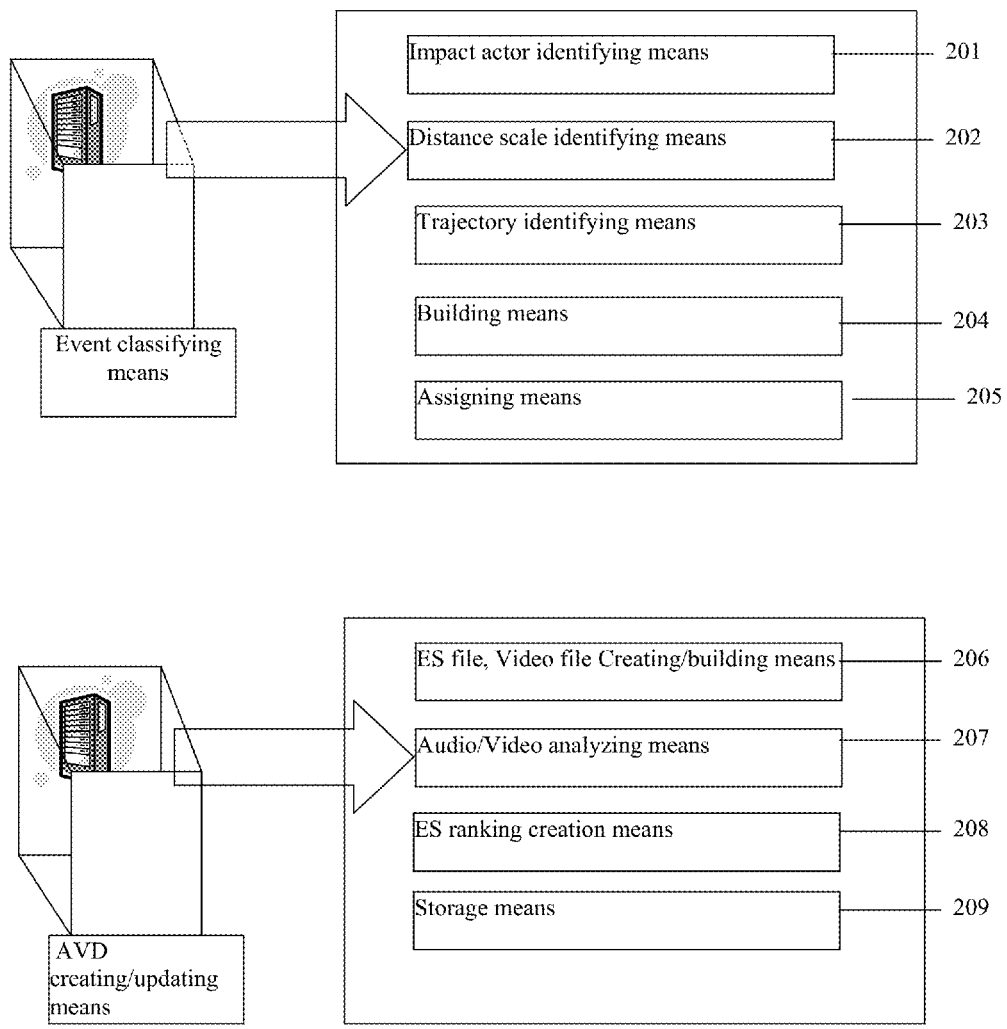
FIG. 2 illustrates the classifying means and means that enable creating of an Audio-Video Database media library in one of its preferred embodiments
Figure 3:
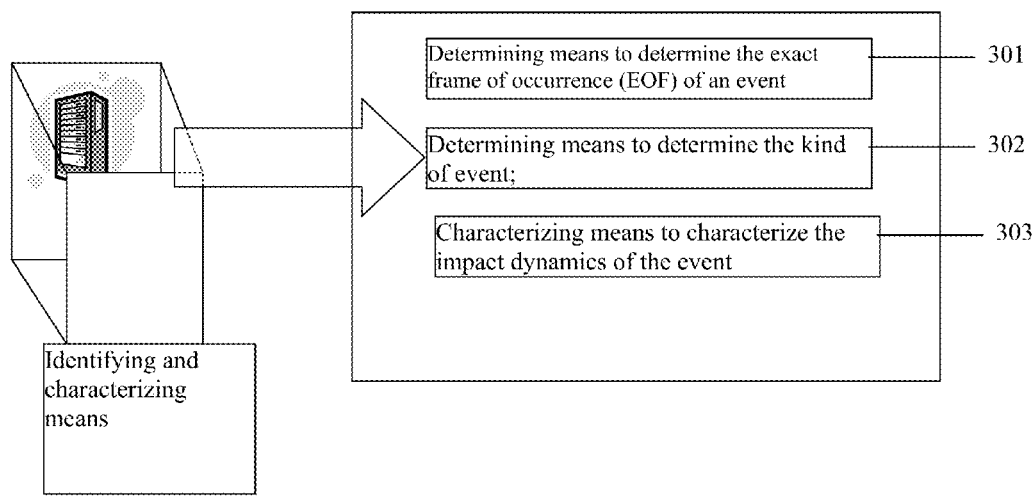
FIG. 3 illustrates a Identifying and characterizing means that are used to identify and characterize impact related events occurring in an AV Stream in the preferred embodiments.
Figure 4:
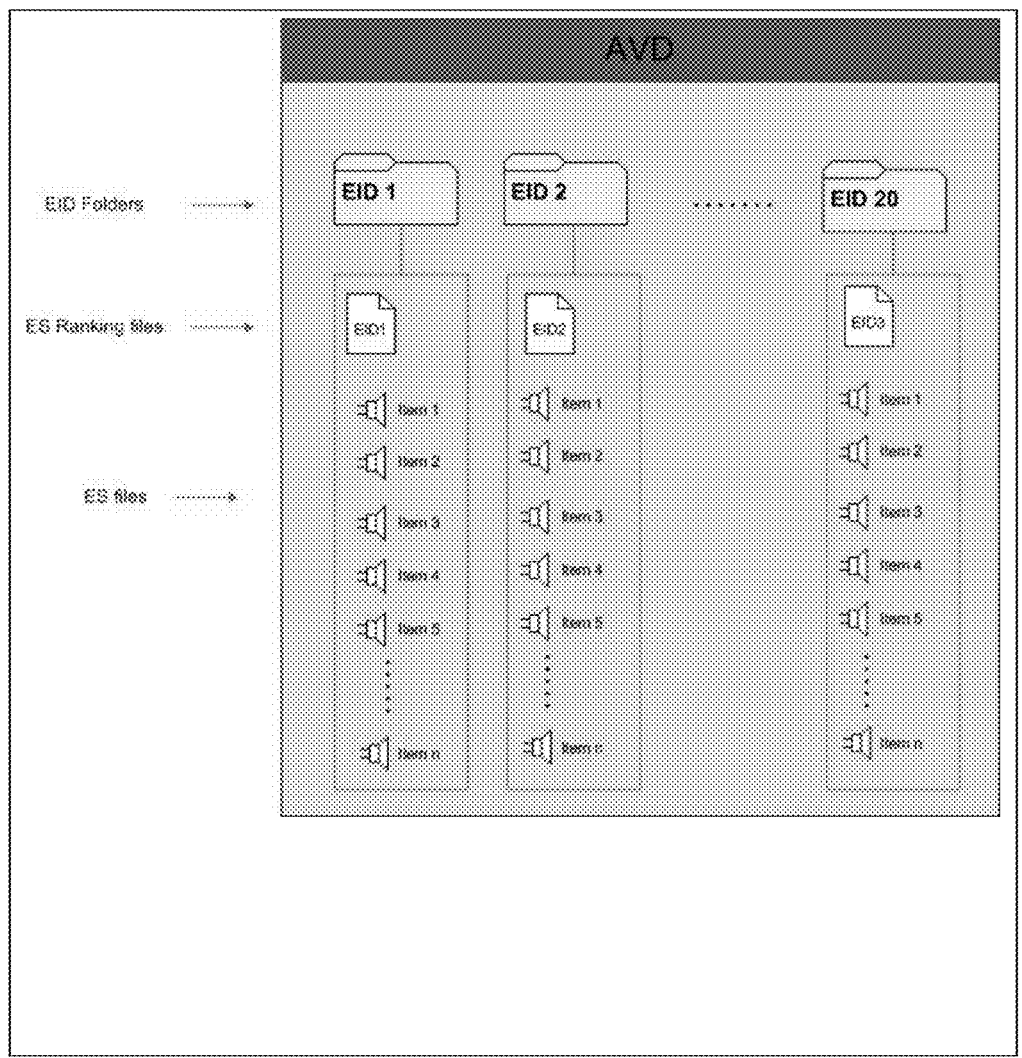
FIG. 4 illustrates an AVD as built by the instant invention.
Figure 5:
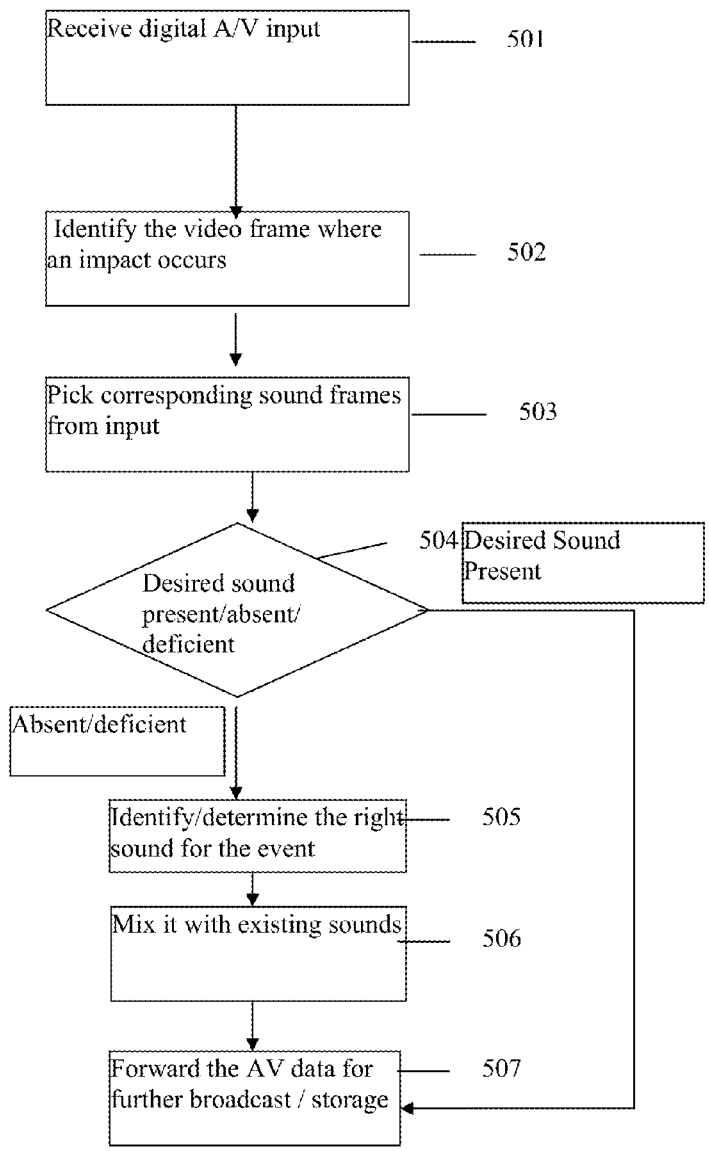
FIG. 5 illustrates the flow of audio-video information while using the preferred embodiments of the instant invention.
Figure 6:
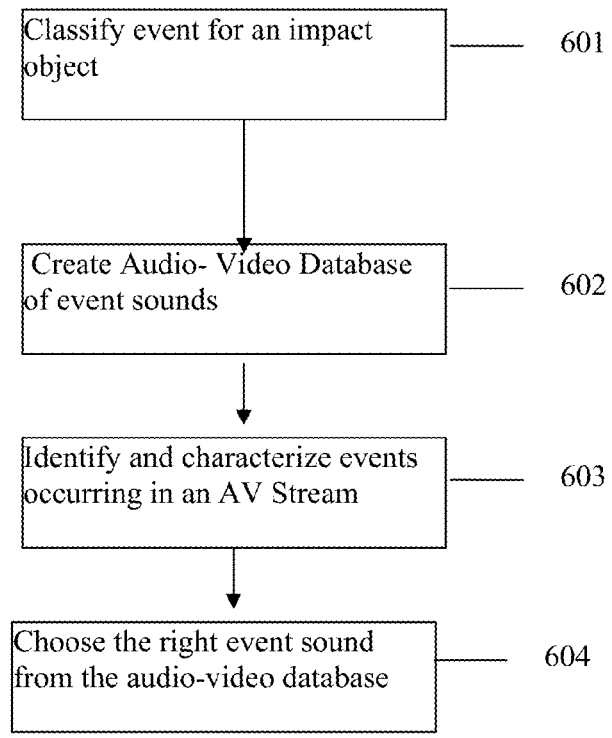
FIG. 6 illustrates a method of enabling identification of a Right Event sound (ES) corresponding to an impact related event using the preferred embodiments.
Figure 7:
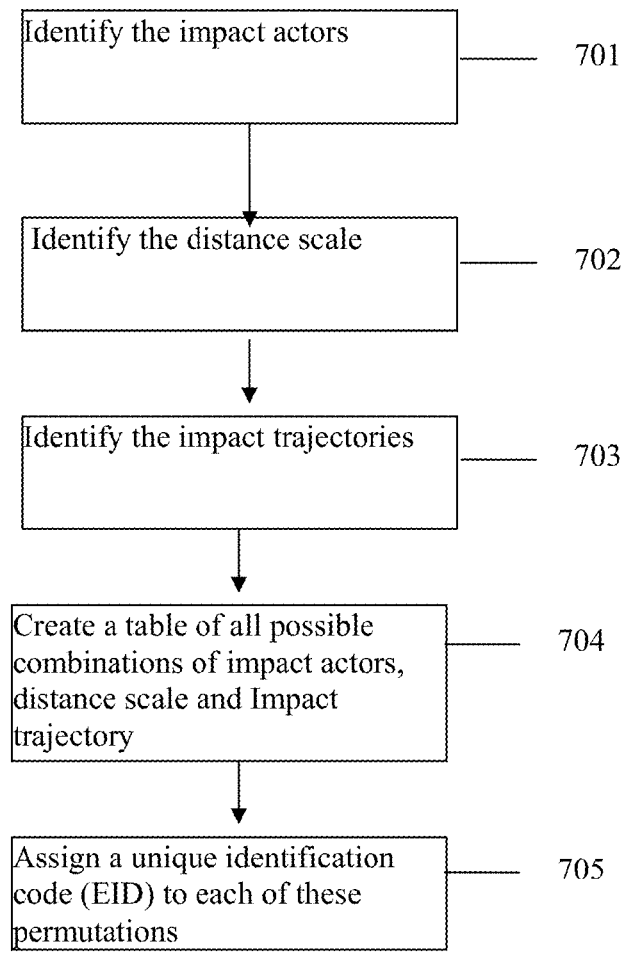
FIG. 7 illustrates the method of classifying events for an impact object using the preferred embodiments.
Figure 8:
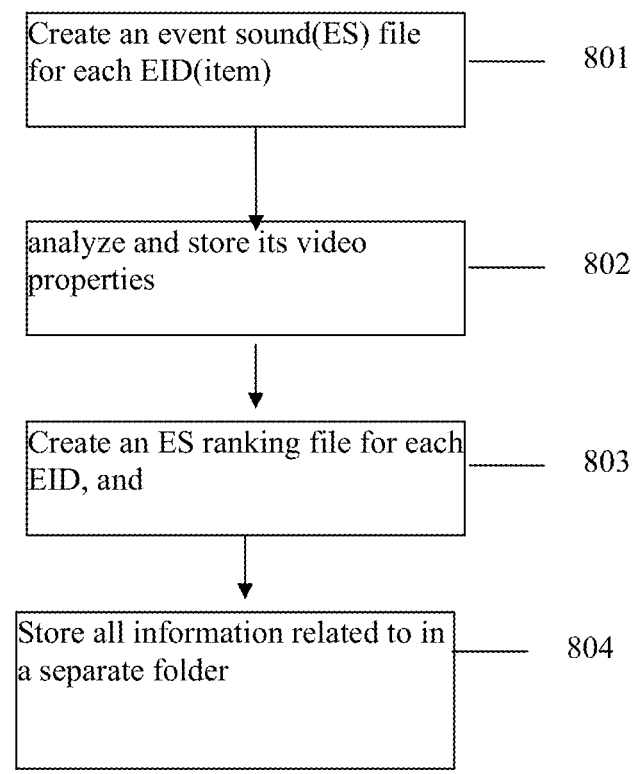
FIG. 8 illustrates the method of creating an Audio-visual Database using the preferred embodiments.
Figure 9:
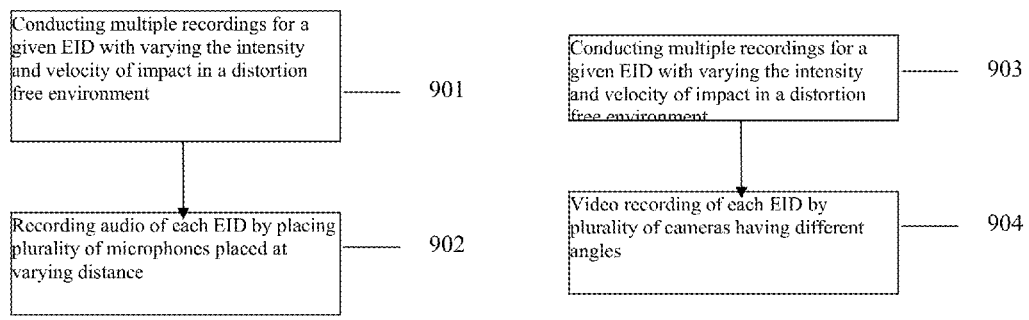
FIG. 9 illustrates the methods of creating the Event Sound (ES) file and the method of creating video files for each EID (items) using the preferred embodiments.
Figure 10:
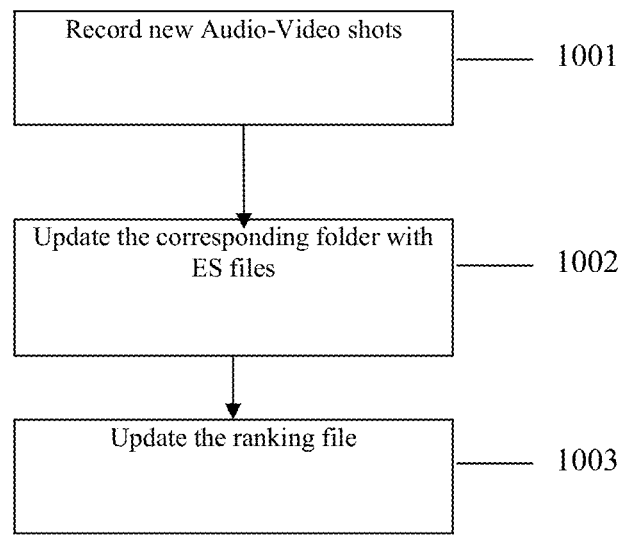
FIG. 10 illustrates a method of updating AVD using the preferred embodiments.
Figure 11:
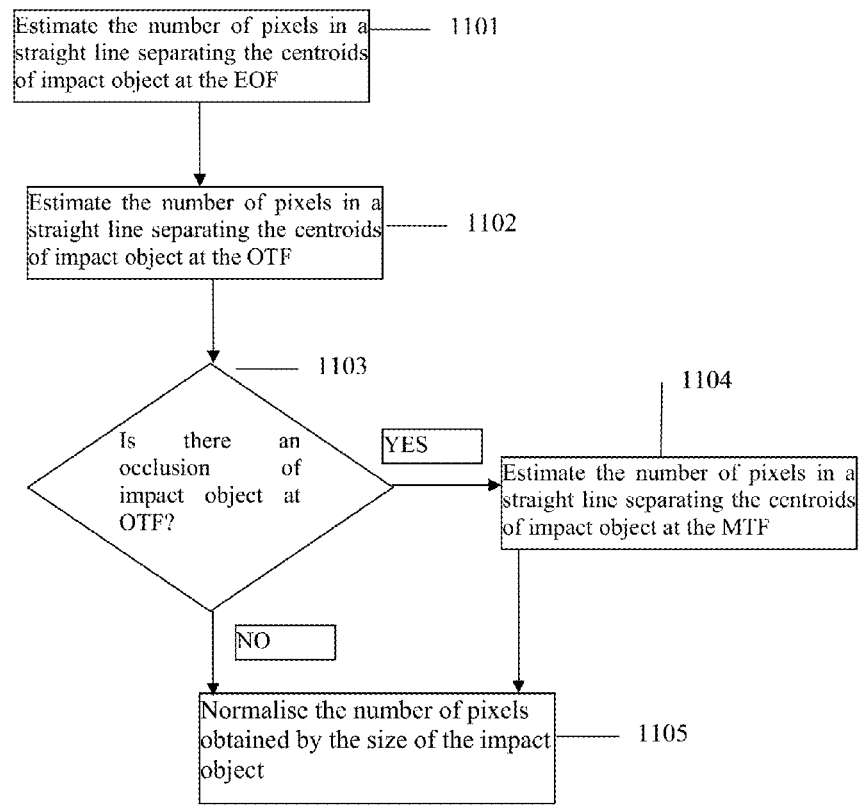
FIG. 11 illustrates a method of determining the NPD using the preferred embodiments.
Figure 12:
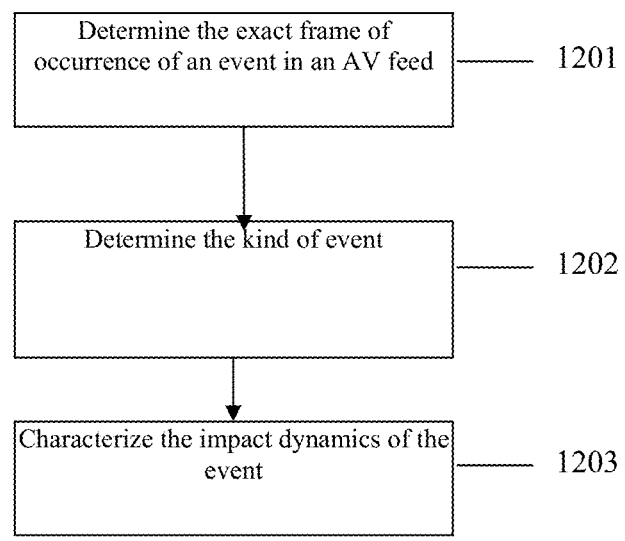
FIG. 12 illustrates a method of identifying and charactering events occurring in an AV stream using the preferred embodiments.
Figure 13:
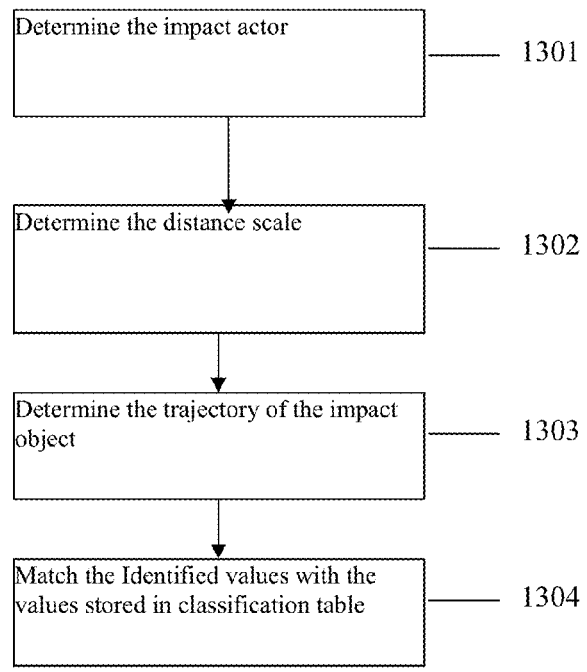
FIG. 13 illustrates a method of determining the kind of event using the preferred embodiments.
Figure 14:
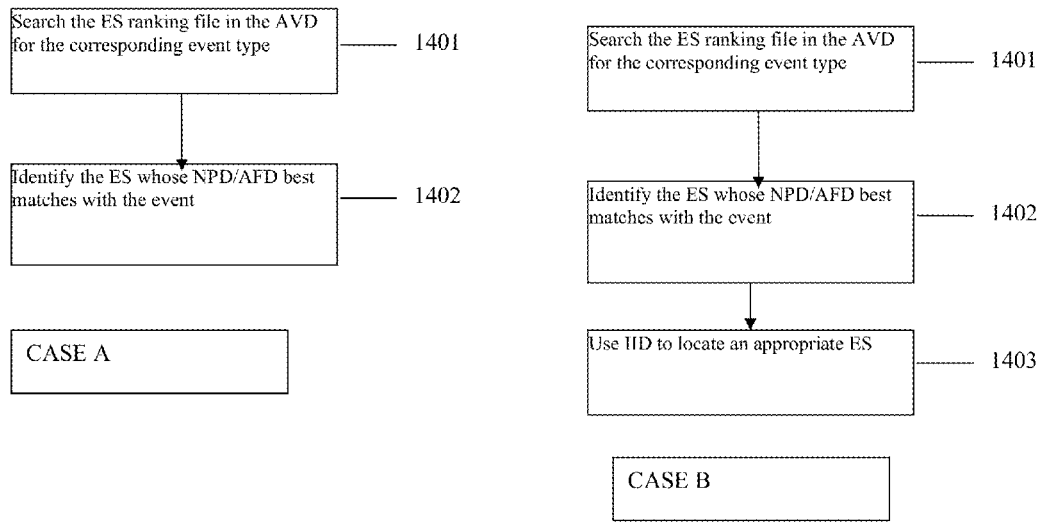
FIG. 14 illustrates a method a choosing the appropriate ES from the AVD using the preferred embodiments.

In one of the preferred embodiments of the instant invention as shown in FIGS. 1-15, we try to explain the method and means used in the preferred embodiments of the instant invention using a scenario wherein the system has been connected to an Audio-Video (AV) stream for a football match broadcast. The impact object here is a soccer ball.

In a preferred embodiment of the instant invention the system using its classification means classifies all possible events for an impact object (601).

For the given Impact object, events are classified based on the key parameters that influence the nature of the Event sound. These key parameters have been identified as:

Impact Actor: An entity (that can be a person or object or part of them that can potentially act on the impact object to generate audible sound that is discernibly unique to an impact event between itself and the impact object The Distance Scale: A scale used to classify the different distances traveled by the impact object after an impact event with an impact actor.

Impact Trajectory: Identifies the travel path of the impact object after the impact event (or leading to the impact event).

So while classifying the events for an impact object one needs to identify the impact actors (701), identify the distance scale (702) and identify the impact trajectories (703) The system then creates a table of all possible combinations of impact actors, distance scale and Impact trajectory (704) and then assigns each of these combinations an EID (Unique Event ID) (705).

FIG. 15 shows a sample classification of Events for Soccer, where the impact object is the soccer ball and involves various Impact Actors, distance scales and impact trajectories.

Once the events (EID) have been classified the system enables creation of an Audio video database.

The system then creates an Audio-video database (AVD) of event sounds (602) by recording the audio and video properties of each event and storing relevant information in an organized manner as described here below.

For each event, multiple occurrences (instances) of that event are enacted in a controlled distortion free environment (acoustic Shielded room). This is referred to as a shot, and each instance is referred to as an item. An Audio-Visual recording is done for each shot using multiple microphones at varying distances and capture directions (Close Side Front, Close Side Back) (901) and multiple camera's from varying angles (side shot, in-line shot etc) (903).

The Audio recording of each shot is processed by manual or automatic means to generate Event-Sound (ES) Files (801). An ES file is essentially an audio file (way or other format) representing the audio captured for an item (event instance). There is one ES file for each item in a shot. Further, each ES file is analyzed (802) to further generate the audio descriptive information about it such as Low Level Descriptors, Mpeg Descriptors, MFCC Descriptors and other basic properties such as length of the Audio file, its RMS value etc.

In preferred embodiments of the instant invention the Video recording of each shot is processed by manual or automatic means to generate the following information for each item in the shot, both of which help quantify the intensity of impact and velocity of the impact object.

Normalized Pixel Distance (NPD)

Absolute Field Distance (AFD)

In the instant invention we define NPD as following:

NPD is a pixel based scale that has been designed to measure the distance travelled by the impact object in a video footage and in a manner which is completely independent of scene related changes such as proximity (close up and long shot) and camera movement (panning).

The NPD is based on the location of the impact object in framework of specific frames at and after the point of impact. In order to calculate the NPD of an impact object for an impact event, the Impact object must be accurately located at the frames identified below.

EOF (Event Occurs Frame): The frame at the point of impact

OTF (Optimally tracked Frame): The frame that occurs 5 frames after the EOF

MTF (Minimal Tracked Frame): The Frame that occurs 3 frames after the EOF

The NPD is then calculated as follows. First the number of Pixels in a straight line separating the centroids of the impact object at the EOF and OTF is estimated (1101) (1102). In such cases where there is occlusion of the impact object at the OTF, then the MTF may be used instead. The number of pixels thus obtained is then normalized by the size of the impact object as given by the diagonal of a rectangular bounding box. The normalizing by size ensures that the NPD estimated is agnostic of the camera proximity (close up, long shot etc.). Additionally panning correction may also be incorporated although it has been observed here that the impact of panning is minimal extending to the OTF frame span of 5 frames.

In the instant invention we define AFD as following:

AFD is a scale in standard distance units (e.g. Meters, Feet etc) to measure the distance travelled by the impact object in a video footage. Well known techniques such as homograph may be used to identify the real location of the impact object in the EOF and track how far it has moved in real distance units at the OTF and MTF frames.

Finally a ES ranking file is created which lists all the ES in the ascending order of rank vis-à-vis the NPD and AFD values, along with the various Audio properties and the discerned NPD and AFD values Finally a ES ranking file is created which lists all the ES in the ascending order of rank vis-à-vis the NPD and AFD values, along with the various Audio properties and the discerned NPD and AFD values.

The AVD is then built by creating a separate folder, one for each Event, where all the ES files for that event are stored along with their ranking files. The AVD is updated by recording new shots (1001) and updating the corresponding folder with ES files (1002) as well as consolidating and updating the ranking file (1003).

An AVD as built by the instant invention is illustrated as FIG. 16.

For any AV input stream (as mentioned in FIG. 5) stream or file which requires sound enhancement), the occurrence of a particular type of event (from those listed in the event classification table) is first confirmed. The AV input stream so mentioned could be any Audio-video file or a broadcast stream. The preferred embodiments of the invention have the capability to process all kind of digital Audio-Video.

The system then identifies and characterizes occurrence of an event (EID) in an AV (Audio-Video Stream) (603)

In a preferred embodiment of the instant invention, the identification and characterization of the ES (event sound) is done without manual interruption.

In yet another preferred embodiment of the instant invent, the system further has interrupt means to manually interrupt the AV stream when an event occurs.

In the preferred embodiment of the instant invention for detecting the event the system determines the following:

The Exact frame where the event occurs (1201), i.e. the EOF, the MTF and the OTF The kind of event (1202) (given as any event from the event classification table) like pass, jab trap etc in case of football.

Once the occurrence of an event is confirmed as described above, the event is analyzed so as to suitably characterize its impact dynamics (1203). More specifically, the following things are ascertained:

a) The Impact ID
b) NPD and/or AFD

The Impact ID or IID, which essentially specifies the impact class for an event as perceived by the person identifying the event. In the illustration three classes are used: Hard, Medium & Soft. For example, in case of an AV stream of a football match broadcast when an event such as a pass (FPA) occurs, it could be perceived as a Hard, Medium or Soft kind of pass. The IID is a perception based criteria and is given during the manual identification of events.

Finally right event sound (ES) is chosen from the AVD (audio-video database) (604). During this process the system searches the ES ranking file in the AVD for the corresponding event type (1401). It then identifies the ES whose NPD and AFD best matches that of the occurring event (1402).

Sometimes, both the NPD and AFD of the occurring event may not be available (e.g. situations related to occluding where the impact object cannot be located clearly in the OTF and MTF frames). In such situations, the system uses IID is used to locate an appropriate ES (1403). For example the 25th percentile maybe used for Soft, 50th Percentile for Medium and the 75th percentile may be used for Hard.

The instant invention may also utilize to create better/desired special effect in gaming industry, film industry and like.

Thus in its exemplary embodiments the system in the instant invention comprises of classifying means to Classify impact events relating to an impact object, Creating means to create and build an Audio-Visual database of Event Sounds for an impact object; identifying and characterizing means to identify and characterize impact events occurring in an AV (audio-video) Stream; selection means for choosing the right Event Sound from the AVD.

The classifying means further comprise of identifying means (201) to identify the impact actors, identifying means (202) to identify the distance scales; Identifying means (203) to identify the impact trajectories; building means (204) to build a table of all possible combinations of impact actors, distance scale and Impact trajectory, assigning means that assigns a unique identification code (EID) to each of these permutations.

The creating means of an Audio-visual Database further comprise of creating means (206) to create an event sound (ES) file for each EID (item), analyzing means (207) to analyze audio properties, storage means (209) to store the audio properties; creating mean (206)s to create a video file for each EID, analyzing means to analyze video properties, storage means (209) to store the video properties, ES ranking creating means (208) to create an ES ranking file for each EID, and a data storage to store all information related to an item in a separate folder.

The creating means of creating an ES (event sound) file further comprise plurality of microphones placed at varying distance; means for simulating a distortion free environment system.

The means for creating a video file for each EID further comprise of plurality of cameras with different camera angles; means for simulating a distortion free environment system.

The means for updating AVD comprise of recording means to record new Audio-Video shots; updating means to update the corresponding folder with ES files, and updating means to update the ES ranking file.

The identifying and charactering means further comprise of determining means (301) to determine the exact frame of occurrence (EOF) of an event in an AV feed; determining means (302) to determine the kind of event; characterizing means (303) to characterize the impact dynamics of the event, The determining means used to determine the kind of event comprise of determining means to determine the impact actor, determining means to determine the distance scale, determining means to determine the trajectory of the impact object, mapping and matching means to match the Identified values with the values stored in classification table.

The means that characterize the impact dynamics of the event comprise of determining means to determine the perceived impact class of the event;

determining means to determine the value of NPD and AFD based on the MTF and OTF frames from the EOF.

The system enabling choice of the appropriate ES from the AVD comprises of searching means to search the ES ranking file in the AVD for the corresponding event type; and identifying means to identifying the ES whose NPD/AFD best matches with the event.

System enabling choice of the appropriate ES from the AVD further comprises of comprising means to use IID to locate an appropriate ES where NPD or AFD values are unavailable due to occlusions.

The instant invention thus solves a big problem in A/V industry especially on occasions like broadcast of a field sport events (say for e.g. Hockey) where it is very difficult to capture impact related sound (say dribbling of ball, a push or pass by the player). This may due to the reason that microphones cannot be placed on all the positions or it may be difficult to capture exact impact sound due to surrounding noise etc.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention. Such modifications are apparent.

What is claimed is:

1. System of enabling identification of a right Event sound corresponding to an impact related event, system comprising:
    a server;
    at least one software module stored on a non-transitory computer readable storage medium of the server which provides a system for enabling identification of a right Event sound corresponding to an impact related event which can be accessed by a user via a server;
    the at least one software module including:
        Classifying means to classify the events for an impact object;
        Creating means to Create and build an audio-video database of Event Sounds
        Identifying and characterizing means to identify and characterize events occurring in an audio-video Stream,
        Selection means for choosing the right Event Sound from the audio-video database.

2. System as claimed in claim 1 wherein the classifying means further comprise of:
    Identifying means to identify the impact actors;
    Identifying means to identify the distance scales;
    Identifying means to identify the impact trajectories;
    Building means to build a table of all possible combinations of impact actors, distance scale and Impact trajectory,
    Assigning means that assigns a unique identification code to each of these permutations.

3. System as claimed in claim 1 wherein the creating means of an Audio-visual Database further comprise of:
    Creating means to create an event sound file for each unique identification code (item),
    Analyzing means to analyze audio properties, storage means to store the audio properties;
    Creating means to create a video file for each unique identification code,
    Analyzing means to analyze video properties,
    Storage means to store the video properties
    Creating means to create an event sound ranking file for each unique identification code, and
    Data storage to Store all information related to in a separate folder.

4. System as claimed in claim 3 where the creating means of creating an event sound file further comprise:
    Plurality of microphones placed at varying distance;
    Means for simulating a distortion free environment system.

5. System as claimed in claim 3 wherein the means for creating a video file for each unique identification code further comprise:
    Plurality of cameras with different camera angles;
    Means for simulating a distortion free environment system.

6. System as claimed in claim 3 wherein the system further comprises a means for updating audio-video database, means further comprising of:
    Recording means to record new Audio-Video shots;
    Updating means to update the corresponding folder with event sound files, and
    Updating means to update the event sound ranking file.

7. System as claimed in claim 1 wherein the identifying and charactering means further comprise of:
    Determining means to determine the exact frame of occurrence of an event in an audio-video feed;
    Determining means to determine the kind of event;
    Characterizing means to characterize the impact dynamics of the even.

8. System as claimed in claim 7 wherein the determining means used to determine the kind of event comprise of:
    Determining means to determine the impact actor,
    Determining means to determine the distance scale,
    Determining means to determine the trajectory of the impact object,
    Mapping and matching means to match the Identified values with the values stored in classification table.

9. System as claimed in claim 7 wherein means that characterize the impact dynamics of the event comprise of:
    Determining means to determine the perceived impact class of the event;
    Determining means to determine the value of normalized pixel distance and absolute field distance based on the minimally tracked frame and optimally tracked frame frames from the exact frame of occurrence.

10. System enabling choice of the appropriate event sound from the audio-video database, System comprising of:
    a server;
    at least one software module stored on a non-transitory computer readable storage medium of the server which provides a system for enabling choice of the appropriate event sound from the audio-video database which can be accessed by a user via a server;
    Searching means to search the event sound ranking file in the audio-video database for the corresponding event type;
    Identifying means to identifying the event sound whose normalized pixel distance or absolute field distance or both best matches with the event.

11. System enabling choice of the appropriate event sound from the audio-video database, comprising the steps of:
    providing at least one software module stored on a non-transitory computer readable storage medium of a server which provides a system for enabling choice of the appropriate event sound from the audio-video database which can be accessed by a user via the server;
    searching means to search the event sound ranking file in the audio video database library for the corresponding event type;
    identifying means to identify the sound event whos normalized pixel distance or absolute field distance or both best matches with the event and means to use the impact identifier to locate an appropriate event sound.

12. Method of enabling identification of a right Event sound corresponding to an impact related event, method comprising steps of:

providing at least one software module stored on a non-transitory computer readable storage medium of a server which provides a system for enabling identification of a right Event sound corresponding to an impact related event which can be accessed by a user via the server;
Classifying events for an impact object;
Creating Audio-Visual database of Event Sounds
Identifying and characterizing events occurring in an audio-video Stream, Choosing the right Event Sound from the audio-video database.

13. Method as claimed in claim 12 wherein the method of classifying events for an impact object further comprising steps of:
Identifying the impact actors;
Identifying the distance scales;
Identifying the impact trajectories;
Creating a table of all possible combinations of impact actors, distance scale and Impact trajectory,
Assigning a unique identification code to each of these permutations.

14. Method as claimed in claim 12 wherein the method of creating an Audio-visual Database further comprising steps of:
Creating an event sound file for each unique identification code (item), analyzing and storing its audio properties;
Creating a video file for each unique identification code, analyzing and storing its video properties;
Creating an event sound ranking file for each unique identification code, and Storing all information related to in a separate folder.

15. Method as claimed in claim 14 where the method of creating an event sound ranking includes listing all the event sound for that unique identification code in an orderly manner based on a sorting of the stored audio and video properties of the event sound.

16. Method as claimed in claim 14 where the method of creating an event sound file comprising steps of: Conducting multiple recordings for a given unique identification code with varying the intensity and velocity of impact in a distortion free environment Recording audio of each unique identification code by placing plurality of microphones placed at varying distance.

17. Method as claimed in claim 14 wherein the method of creating a video file for each unique identification code comprises steps of:
Conducting multiple recordings for a given unique identification code with varying the intensity and velocity of impact in a distortion free environment; and video recording of each unique identification code by plurality of cameras having different angles.

18. Method as claimed in claim 14 wherein the event sound ranking file ranks the event sound based on normalized pixel distance/absolute field distance values.

19. Method as claimed in claim 14 wherein the method further comprises a method of updating audio-video database, comprising steps of:
Recording new Audio-Video shots;
Updating the corresponding folder with event sound files, and
Updating the event sound ranking file.

20. Method as claimed in claim 12 wherein the method of identifying and charactering events occurring in an audio-video stream comprising steps of determining the exact frame of occurrence of an event in an audio-video feed; determining the kind of event; and Characterizing the impact dynamics of the event.

21. Method as claimed in claim 20 wherein the method of determining the kind of event comprises steps of:
Identifying the impact actor,
Identifying the distance scale,
Identifying the trajectory of the impact object,
Matching the Identified values with the values stored in classification table.

22. Method as claimed in claim 20 wherein the process of charactering the impact dynamics of the event comprises steps of: determining the perceived impact class of the event; determining the value of normalized pixel distance and absolute field distance based on the minimally tracked frame and optimally tracked frame frames from the exact frame of occurrence.

23. A method a choosing the appropriate ES from the audio-video database method comprising steps of:
providing at least one software module stored on a non-transitory computer readable storage medium of a server which provides a system for enabling choice of the appropriate event sound from the audio-video database which can be accessed by a user via the server;
searching the event sound ranking file in the audio-video database for the corresponding event type; Identifying the event sound whose normalized pixel distance/absolute field distance best matches with the event.

24. A method a choosing the appropriate event sound from the audio-video database method comprising steps of:
providing at least one software module stored on a non-transitory computer readable storage medium of a server which provides a system for enabling choice of the appropriate event sound from the audio-video database which can be accessed by a user via the server;
searching the event sound ranking file in the audio-video database for the corresponding event type; Identifying the event sound whose normalized pixel distance/absolute field distance best matches with the event and
using IID to locate an appropriate event sound.

* * * * *